(12) United States Patent
Liu et al.

(10) Patent No.: US 11,843,272 B2
(45) Date of Patent: Dec. 12, 2023

(54) ELECTRONIC DEVICE AND METHOD FOR IMPROVING BATTERY CYCLING PERFORMANCE

(71) Applicant: Ningde Amperex Technology Limited, Ningde (CN)

(72) Inventors: Ao Liu, Ningde (CN); Meili Gong, Ningde (CN); Chao Gao, Ningde (CN); Zhanzhao Fang, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 485 days.

(21) Appl. No.: 17/019,660

(22) Filed: Sep. 14, 2020

(65) Prior Publication Data

US 2021/0296919 A1    Sep. 23, 2021

Related U.S. Application Data

(63) Continuation-in-part of application No. PCT/CN2020/080278, filed on Mar. 19, 2020.

(51) Int. Cl.
| | |
|---|---|
| *H02J 7/00* | (2006.01) |
| *C09J 7/29* | (2018.01) |
| *H01M 50/46* | (2021.01) |
| *H01M 50/449* | (2021.01) |
| *H01M 10/44* | (2006.01) |
| *H01M 10/46* | (2006.01) |

(52) U.S. Cl.
CPC .......... *H02J 7/007182* (2020.01); *C09J 7/29* (2018.01); *H01M 10/44* (2013.01); *H01M 10/46* (2013.01); *H01M 50/449* (2021.01); *H01M 50/461* (2021.01); *C09J 2203/326* (2013.01); *C09J 2409/00* (2013.01); *C09J 2425/00* (2013.01); *C09J 2427/00* (2013.01); *C09J 2433/00* (2013.01); *H01M 2220/30* (2013.01)

(58) Field of Classification Search
CPC .......... H02J 7/007182; H01M 50/461; H01M 50/449; H01M 10/44; H01M 10/46; H01M 2220/30; C09J 7/29; C09J 2203/326; C09J 2409/00
USPC ....................................................... 320/132
See application file for complete search history.

(56) References Cited

U.S. PATENT DOCUMENTS

| | | | | |
|---|---|---|---|---|
| 2017/0018818 A1* | 1/2017 | Miura | ................. | H01M 4/5825 |
| 2019/0120910 A1* | 4/2019 | Ghantous | ............. | G01R 31/392 |

FOREIGN PATENT DOCUMENTS

| | | |
|---|---|---|
| CN | 104733793 A | 6/2015 |
| CN | 108023130 A | 5/2018 |

(Continued)

OTHER PUBLICATIONS

Machine Translation of CN109860486, 19 pages (Year: 2019).*

(Continued)

*Primary Examiner* — Nathaniel R Pelton
(74) *Attorney, Agent, or Firm* — Maier & Maier, PLLC

(57) ABSTRACT

A method for improving cycling performance of a battery includes, in a first stage, charging the battery with a first-stage current until a voltage of the battery reaches a first-stage voltage value and in a second stage, charging the battery with a second-stage current until the voltage of the battery reaches a second-stage voltage value. The second-stage voltage value is greater than the first-stage voltage value, and the second-stage current is less than the first-stage current.

18 Claims, 11 Drawing Sheets

(56) References Cited

FOREIGN PATENT DOCUMENTS

| | | | |
|---|---|---|---|
| CN | 108565381 | A | 9/2018 |
| CN | 108711605 | A | 10/2018 |
| CN | 108878748 | A | 11/2018 |
| CN | 109148798 | A | 1/2019 |
| CN | 109860486 | A | 6/2019 |
| CN | 110098646 | A | 8/2019 |
| WO | 2016030389 | A | 3/2016 |
| WO | 2018027652 | A1 | 2/2018 |

OTHER PUBLICATIONS

Office Action dated Jul. 4, 2022, in corresponding Chinese Application No. 202080002557.2; 14 pages.
Decision of Rejection dated Dec. 27, 2022, in corresponding Chinese Application No. 202080002557.2, 11 pages.

* cited by examiner

In a first stage, charging the battery with a first-stage current until a voltage of the battery reaches a first-stage voltage value, wherein in the first stage, charging the battery by a third charging mode until the voltage of the battery reaches the first-stage voltage value, and the third charging mode includes a first charging mode or a second charging mode — S91

In a second stage, charging the battery with a second-stage current until the voltage of the battery reaches a second-stage voltage value, the second-stage voltage value is greater than the first-stage voltage value, and the second-stage current is less than the first-stage current, wherein the battery includes a positive electrode, a negative electrode, and a separator provided between the positive electrode and the negative electrode, a bonding force between the separator and the positive electrode or a bonding force between the separator and the negative electrode is greater than or equal to 3N/m — S92

FIG. 9

In a first stage, charging the battery with a first-stage current until a voltage of the battery reaches a first-stage voltage value, wherein in the first stage, charging the battery by a third charging mode until the voltage of the battery reaches the first-stage voltage value, and the third charging mode includes a first charging mode or a second charging mode — S101

In a second stage, charging the battery with a second-stage current until the voltage of the battery reaches a second-stage voltage value, wherein the second-stage voltage value is greater than the first-stage voltage value, and the second stage current is less than the first-stage current; wherein in the second stage, charging the battery by a first charging mode or a second charging mode until the voltage of the battery reaches the second-stage voltage value, and the battery includes a positive electrode, a negative electrode, and a separator provided between the positive electrode and the negative electrode, a bonding force between the separator and the positive electrode or a bonding force between the separator and the negative electrode is greater than or equal to 3N/m — S102

FIG. 10

ELECTRONIC DEVICE AND METHOD FOR IMPROVING BATTERY CYCLING PERFORMANCE

CROSS-REFERENCE TO RELATED APPLICATIONS

This application claims priority to International Application No. PCT/CN2020/080278 filed on Mar. 19, 2020, the contents of which are incorporated by reference herein.

TECHNICAL FIELD

The subject matter herein generally relates to batteries, especially relates to a method for improving battery cycling performance and an electronic device.

BACKGROUND

With popularization and application of consumer lithium-ion batteries in recent years, the lithium-ion batteries are continuously iteratively developed, to gradually increase the energy density of the lithium-ion batteries. Especially for lithium cobalt oxide lithium ion batteries, an upper limit of the cathode voltage of the batteries continues to increase, which can damage structure of the cathode and introduce side effects.

Low capacity retention rate of the lithium ion battery at high temperatures is a common problem (that is, high temperature cycle failure). At present, a main method for solving the problem of the high temperature cycle failure includes optimizing electrolyte formulation, but the main method will bring about a certain degree of deterioration of other battery performance parameters (such as low temperature discharge and high rate charging). Therefore, how to improve cycling life of the battery under high temperature conditions whilst not affecting the other electrical properties of the battery has become a very important issue.

SUMMARY

A method for charging a battery and an electronic device are disclosed.

The method for improving cycling performance of a battery, the battery includes a positive electrode, a negative electrode, and a separator located between the positive electrode and the negative electrode. A bonding force between the separator and the positive electrode, and/or a bonding force between the separator and the negative electrode are greater than or equal to 3 N/m. The method includes: in a first stage, charging the battery with a first-stage current until a voltage of the battery reaches a first-stage voltage value; in a second stage, charging the battery with a second-stage current until the voltage of the battery reaches a second-stage voltage value, wherein the second-stage voltage value is greater than the first-stage voltage value, and the second-stage current is less than the first-stage current.

The electronic device includes a battery. The battery includes a positive electrode, a negative electrode, and a separator located between the positive electrode and the negative electrode, and a bonding force between the separator and the positive electrode and/or a bonding force between the separator and the negative electrode is greater than or equal to 3 N/m. A controller stores one or more programs that, when executed by the controller, cause the controller to: in a first stage, charging the battery with a first-stage current until a voltage of the battery reaches a first-stage voltage value. In a second stage, charging the battery with a second-stage current until the voltage of the battery reaches a second-stage voltage value, wherein the second-stage voltage value is greater than the first-stage voltage value, and the second-stage current is less than the first-stage current.

Compared with prior art, the foregoing method and the electronic device, are novel, and advance the art. The method for improving the cycling performance of the battery of the present application can combine the ways of adopting the high-adhesion separator in the battery, and increasing the charge limiting voltage of the battery (i.e., increasing the voltage from the first-stage voltage value to the second-stage voltage value). The method can shorten a time that the cathode of the battery is kept at a high potential and reduce the occurrence of side effects or reactions, thereby improving the cycling performance of the battery. In addition, the method can combine with a high-adhesion separator, which can increase pressure of pores in the positive and negative electrodes, and suppress the bloating of the battery cell after the voltage rises. The method also can reduce an interface reaction rate between a cathode and an electrolyte of the battery and further can suppress the occurrence of side reactions, thereby significantly improving the cycling performance of the battery in a high temperature environment.

BRIEF DESCRIPTION OF THE DRAWINGS

FIG. 9 is a flowchart of a second embodiment of a method for improving cycling performance of a battery shown in FIG. 2.

FIG. 10 is a flowchart of a third embodiment of a method for improving cycling performance of a battery shown in FIG. 2.

DETAILED DESCRIPTION

In the following, technical solutions in the embodiments of the present application will be clearly described with reference to the accompanying drawings in the embodiments of the present application. Obviously, the described embodiments are part of the embodiments of the present application, but not all of them.

Based on the implementations in the application, all other implementations obtained by a person of ordinary skill in the art without paying any creative labor fall within the protection scope of this application.

Low capacity retention rate of the lithium ion battery at high temperatures is a common problem (that is, high temperature cycle failure). Studies have found two reasons for high temperature cycling failure: one reason is if the battery is being charged, a duration of high temperature and high voltage is long, which easily causes side reactions; the other reason is the generation or expansion of gases in the battery system in the high temperature, in a case of weak adhesion between a positive electrode of the battery and a separator of the battery, and a weak adhesion between a negative electrode of the battery and the separator, the gas production will cause a distance between the positive electrode and the negative electrode to increase, which intensifies the interface reaction rate between the cathode electrode and the negative electrode, leading to increased side reactions.

Figure 1:
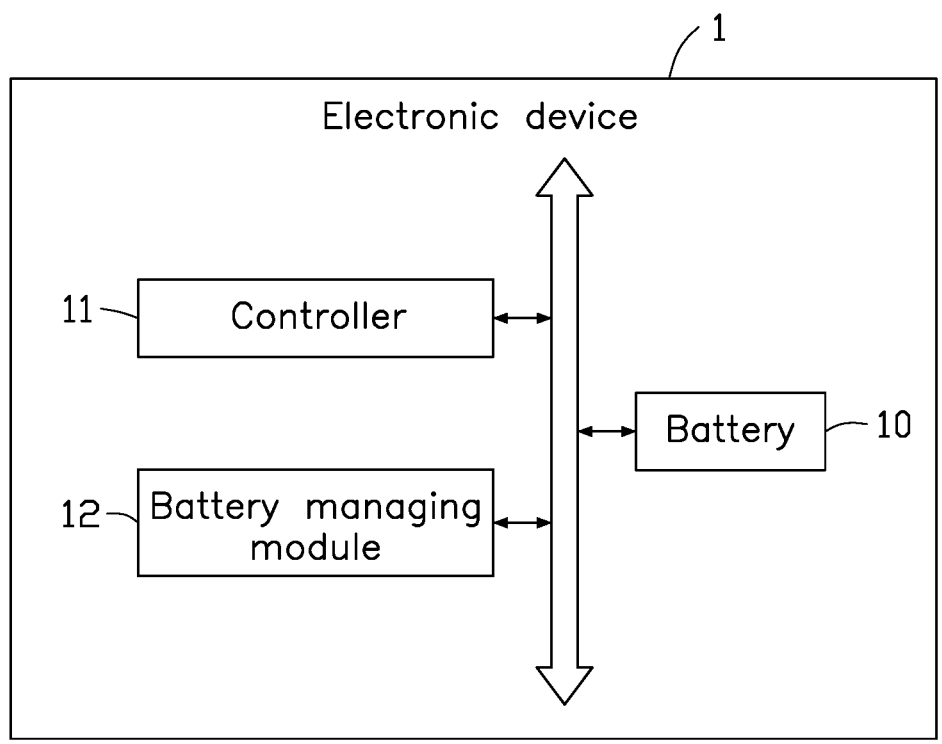
FIG. 1 is a block diagram of an embodiment of an electronic device.

Referring to FIG. 1, FIG. 1 is a block diagram of an embodiment of an electronic device. The electronic device 1 can include, but is not limited to, a battery 10, a controller 11, and a battery managing module 12. The battery 10, the controller 11, and the battery managing module 12 may be connected with each other through a bus, or may be directly electronically connected. The battery 10 may be a rechargeable battery. The battery 10 can include at least one battery cell, which can be recharged in a recyclable manner. In at least one embodiment, the battery 10 can include a positive electrode, a negative electrode, a separator, electrolyte, and a packing shell.

In at least one embodiment, the controller 11 may be used to store computer programs and various data of computer programs. The controller 11 can control the battery managing module 12 to execute the method for improving cycling performance of the battery 10. The controller 11 may be a microcontroller (MCU), a processor, or an application-specific integrated circuit (ASIC), etc., and can control the battery managing module 12 to execute the method for improving cycling performance of the battery 10.

It should be noted that FIG. 1 illustrates only one example of the electronic device, other examples can include more or fewer components that those shown in the embodiment, or have a different configuration of the various components. The electronic device 1 can be, but is not limited to, an electric motorcycle, an electric bicycle, an electric car, a mobile phone, a tablet computer, a personal digital assistant (PDA), a personal computer, or any other suitable rechargeable device.

Although not shown, the electronic device 1 may further include other components such as a WI-FI unit, a BLUETOOTH unit, a speaker, and the like, which are not described in detail here.

Figure 2:
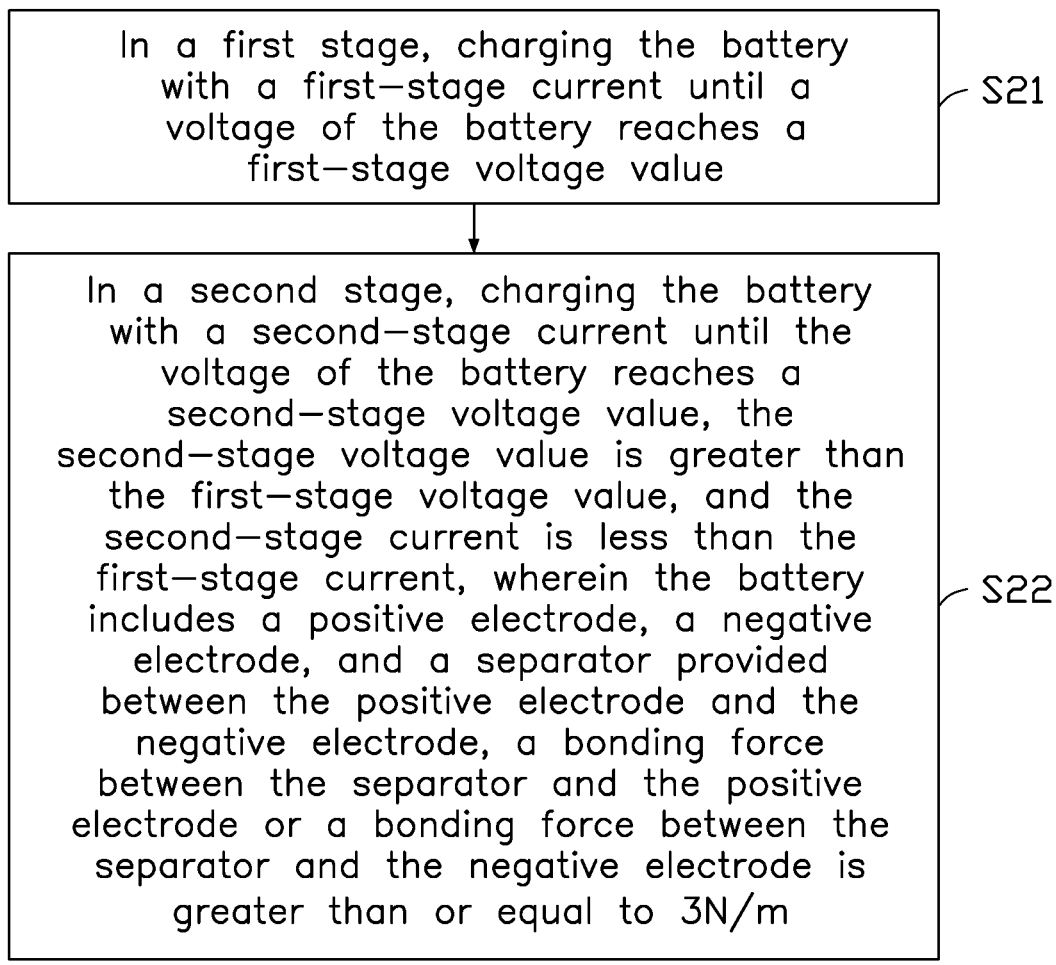
FIG. 2 is a flowchart of an embodiment of a method for improving cycling performance of a battery.

Referring to FIG. 2, FIG. 2 illustrates a flowchart of a method for improving cycling performance of a battery in a first embodiment. The method may be applied to the battery, and may include the following steps:

In block S21, in a first stage, charging the battery with a first-stage current until a voltage of the battery reaches a first-stage voltage value.

In block S22, in a second stage, charging the battery with a second-stage current until the voltage of the battery reaches a second-stage voltage value, the second-stage voltage value is greater than the first-stage voltage value, and the second-stage current is less than the first-stage current.

In at least one embodiment, the battery may include a positive electrode, a negative electrode, and a separator provided between the positive electrode and the negative electrode. The separator may include a porous substrate, a heat-resistant layer coated on at least one surface of the porous substrate and a polymer adhesive layer, wherein the polymer adhesive layer is coated on the surface of the heat-resistant layer or the surface of the porous substrate which is not coated with the heat-resistant layer, and the polymer adhesive layer includes polymer particles, and the number of stacked layers of the polymer particles in the polymer adhesive layer is less than or equal to four.

In at least one embodiment, the polymer particles are selected from at least one of polyvinylidene chloride, polyvinylidene-fluoride-hexafluoropropylene copolymer, styrene-butadiene copolymer, polyacrylonitrile, butadiene-acrylonitrile polymer, polyacrylic acid, polyacrylate and acrylate-styrene, or a copolymer of at least two of the above polymer monomers. A particle size of the polymer particles is 0.2 μm-2 μm. In another embodiment, the particle size of the polymer particles is 0.3 μm-1 μm. Material of the porous substrate is polyethylene, polypropylene, polyethylene terephthalate (PET), cellulose or polyimide.

In at least one embodiment, the separator is a high adhesion separator. A bonding force between the high adhesion separator in the present application and the positive electrode is greater than or equal to 3 N/m, and/or a bonding force between the high adhesion separator in the present application and the negative electrode is greater than or equal to 3 N/m. In some embodiments, the bonding force between the high adhesion separator and the positive electrode, and/or the bonding force between the high adhesion separator and the negative electrode is greater than or equal to 4.3 N/m. By adjusting types, particle sizes, contents, etc., of the polymer particles the bonding force may be adjusted.

In at least one embodiment, a coverage area ratio of the polymer adhesive layer to the porous substrate or to the heat-resistant layer is 15%-85%. In other embodiments, the coverage area ratio is 30%-70%.

In at least one embodiment, by adjusting the bonding force of the separator, pressure of pores in the positive and negative electrodes is increased, which can suppress the problem of gas production of the battery cell. And the high adhesion separator can effectively reduce interlayer distances between the electrodes and the separator, and can reduce an interface reaction rate between a cathode and the electrolyte of the battery, and can improve the cycling performance of the battery.

Figure 3:
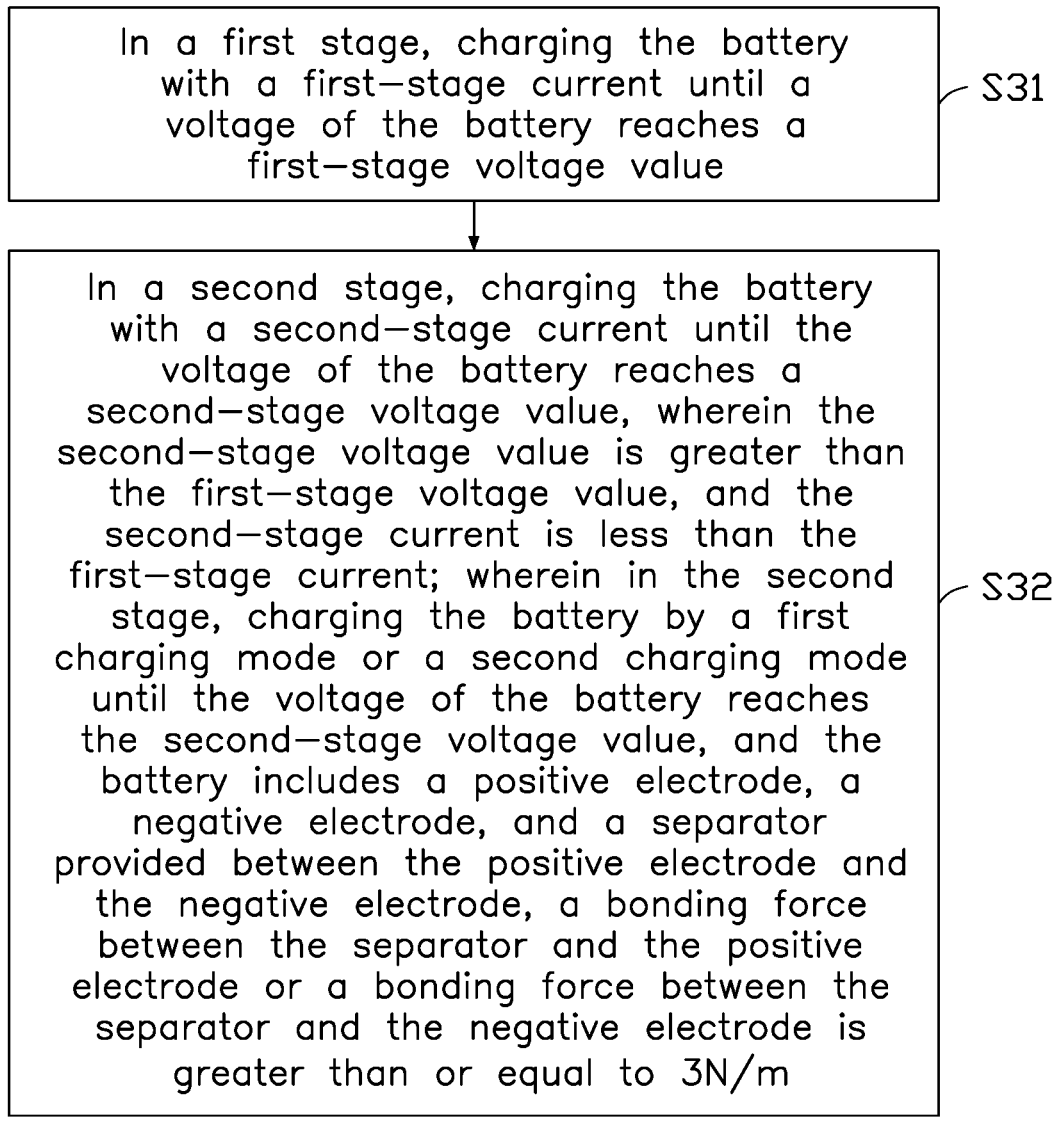
FIG. 3 is a flowchart of a first embodiment of a method for improving cycling performance of a battery shown in FIG. 2.

Referring to FIG. 3, FIG. 3 illustrates an embodiment of the method for improving cycling performance of the battery as shown in FIG. 2.

In block S31, in a first stage, charging the battery with a first-stage current until a voltage of the battery reaches a first-stage voltage value.

In at least one embodiment, the first-stage current may be the constant current which is used in the first stage of the conventional charging method. Or the first-stage current may be a varying current. For example, charging the battery with a constant voltage in the first stage, so that the current (the first-stage current) corresponding to the constant voltage will vary, and simply charging the battery using the first-stage current until the voltage of the battery reaches the first-stage voltage value. The first-stage voltage value is equal to a charging limit voltage (i.e. a well-known charging limit voltage, or written on the surface of battery product).

In block S32, in a second stage, charging the battery with a second-stage current until the voltage of the battery reaches a second-stage voltage value, the second-stage voltage value is greater than the first-stage voltage value, and the second-stage current is less than the first-stage current, and charging the battery by a first charging mode or a second charging mode until the voltage of the battery reaches the second-stage voltage value. The battery may include the positive electrode, the negative electrode, and the separator located between the positive electrode and the negative electrode. A bonding force between the separator and the positive electrode, and/or a bonding force between the separator and the negative electrode is greater than or equal to 3 N/m. In some embodiments, the bonding force is greater than or equal to 4.3 N/m.

In at least one embodiment, the separator may include a porous substrate, a heat-resistant layer coated on at least one surface of the porous substrate and a polymer adhesive layer, wherein the polymer adhesive layer is coated on the surface of the heat-resistant layer or the surface of the porous substrate which is not coated with the heat-resistant layer, and the polymer adhesive layer includes polymer particles, and the number of stacked layers of the polymer particles in the polymer adhesive layer is less than or equal to four.

In at least one embodiment, the polymer particles are selected from at least one of polyvinylidene chloride, polyvinylidene-fluoride-hexafluoropropylene copolymer, styrene-butadiene copolymer, polyacrylonitrile, butadiene-acrylonitrile polymer, polyacrylic acid, polyacrylate and acrylate-styrene, or a copolymer of at least two of the above polymer monomers. A particle size of the polymer particles is 0.2 μm-2 μm. In another embodiment, the particle size of the polymer particles is 0.3 μm-1 μm. Material of the porous substrate is polyethylene, polypropylene, polyethylene terephthalate (PET), cellulose or polyimide.

In at least one embodiment, a coverage area ratio of the polymer adhesive layer on the porous substrate or on the heat-resistant layer is 15%-85%. In other embodiments, the coverage area ratio is 30%-70%.

In at least one embodiment, the first charging mode may include K charging sub-stages sequentially, K is an integer greater than or equal to 2, and the K charging sub-stages may be set as $i^{th}$ charging sub-stage, i=1, 2, . . . , K. In an $i^{th}$ charging sub-stage, which is one of the K charging sub-stages, the controller 11 controls the battery managing module 12 to charge the battery with an $i^{th}$ current value, or with an $i^{th}$ voltage value, or with an $i^{th}$ power value. In an $(i+1)^{th}$ charging sub-stage, the controller 11 controls the battery managing module 12 to charge the battery with an $(i+1)^{th}$ current value, or with an $(i+1)^{th}$ voltage value, or with an $(i+1)^{th}$ power value. In at least one embodiment, a charging current value of the $(i+1)^{th}$ charging sub-stage is less than or equal to a charging current value of the $i^{th}$ charging sub-stage. In another embodiment, the $(i+1)^{th}$ voltage value is greater than or equal to the $i^{th}$ voltage value. In another embodiment, the $(i+1)^{th}$ power value is less than or equal to the $i^{th}$ power value.

In at least one embodiment, the second charge mode may include D charging sub-stages sequentially, D is an integer that is greater than or equal to 2, and the D charging sub-stages may be set as $j^{th}$ charging sub-stage, j=1, 2, . . . , D. Each $j^{th}$ charging sub-stage may include a front $j^{th}$ charging sub-stage and a back $j^{th}$ charging sub-stage. Each of the $j^{th}$ charging sub-stages of the second stage may include a first $j^{th}$ charging sub-stage and a second $j^{th}$ charging sub-stage. In either the first $j^{th}$ charging sub-stage or the second $j^{th}$ charging sub-stage, the battery is not charged, or the battery is charged or discharged with a first $j^{th}$ charging sub-stage current value for a time duration Tj1. In the other one of first $j^{th}$ charging sub-stage and the second $j^{th}$ charging sub-stage, the battery is charged with a second $j^{th}$ charging sub-stage current value for a time duration Tj2. An absolute value of the first $j^{th}$ charging sub-stage current value is less than an absolute value of the second $j^{th}$ charging sub-stage current value.

In at least one embodiment, an average of the current value of the $(j+1)^{th}$ charging sub-stage is less than an average of the current value of the $j^{th}$ charging sub-stage, and if the third charging mode is the second charging mode, an average of the current value of the $j^{th}$ charging sub-stage is less than an average of the current value of the first charging mode or the second charging mode.

It should be noted that the first-stage voltage is equal to the charging limit voltage of the battery.

In this disclosure, the $1^{th}$ sub-charging stage current of the second-stage current is less than the first-stage current, and a charging current value of the $(i+1)^{th}$ charging sub-stage is less than or equal to a charging current value of the $i^{th}$ charging sub-stage, in such a way that an anode potential of the battery will not be lower than a lithium deposition potential. The lithium deposition potential may be derived using the following method. The method includes a step of producing three-electrode cells that basically have the same specification as the battery but each has one more electrode than the battery. The three electrodes include an anode, a cathode and a reference electrode, the reference electrode is made of lithium. The three-electrode cells are employed in a test procedure for deriving the lithium deposition potential of the anode of the battery.

A method for deriving the lithium deposition potential of the anode of the battery may include: producing several three-electrode cells, and the three-electrode cells are charged and discharged at different C-rates (e.g., 1 C, 2 C, 3 C for different three-electrode cells) multiple times (e.g., ten times), and a voltage between the anode and the reference electrode of each three-electrode cell is monitored during the charging and discharging processes. Then, the three-electrode cells are disassembled when fully charged, and the anodes of the three-electrode cells that are charged at different C-rates are examined to see if lithium deposition phenomenon happens (i.e., to see if there is lithium precipitated on a surface of the anode for each three-electrode cell). After determining the greatest C-rate which does not cause lithium deposition phenomenon in the three-electrode cells, the minimum voltage between the anode and the reference electrode of the three-electrode cell that is charged and discharged at the greatest C-rate serves as the lithium deposition potential. It is noted that the current used to charge or discharge a battery is often represented in a form of C-rate, which is a measure of the rate at which the battery is charged or discharged relative to its capacity. The capacity of a battery is generally given in Ah or mAh. As an example, when a battery has a capacity of 1200 mAh, a C-rate of 1 C means that the current to charge the battery has a magnitude of 1200 mA, and a C-rate of 0.2 C means that the current to charge the battery has a magnitude of 240 mA.

The three three-electrode cells being charged respectively at 1 C, 2 C, 3 C ten times and finding that lithium deposition does not happen to the anodes of the three-electrode cells that are charged at 1 C and 2 C but does happen to the anode of the three-electrode cell that is charged at 3 C, the minimum voltage between the anode and the reference electrode of the three-electrode cell that is charged at 2 C during the charging and discharging is taken to serve as the lithium deposition potential for the anode of the battery. Furthermore, the lithium deposition potential for the cathode of the battery may be derived in the similar way, and details thereof are omitted herein for the sake of brevity. Based on the abovementioned test procedure for deriving the lithium deposition potential of the anode of the battery, the anode potential in this disclosure refers to a potential difference between the anode and the reference electrode, i.e., an anode-to-lithium potential, and a cathode potential in this disclosure refers to a potential difference between the cathode and the reference electrode, i.e., a cathode-to-lithium potential.

In this embodiment, the second-stage voltage value is less than an oxidative decomposition voltage of an electrolyte of the battery. The oxidative decomposition voltage of the electrolyte of the battery may be understood as a potential threshold in a way that, when a potential of the battery exceeds the potential threshold, an irreversible reductive or oxidative decomposition reaction may happen to the molecules of a solvent, an additive, or even impurity at an interface between the electrodes and the electrolyte, which is called decomposition of electrolyte. The potential threshold is the reductive decomposition voltage or the oxidative decomposition voltage of the electrolyte of the battery. In at least one embodiment, the second-stage voltage value is less than a sum of the first-stage voltage value plus 500 millivolts.

In the $K^{th}$ charging sub-stage or the $D^{th}$ charging sub-stage of the second stage, the controller 11 may control the battery managing module 12 to charge the battery until the voltage of the battery reaches the second-stage voltage value that corresponds to a cut-off condition which may be a cut-off voltage value, a cut-off current value, or a cut-off state of charge. In more detail, in the $K^{th}$ charging sub-stage or the $D^{th}$ charging sub-stage, when the second-stage current generated by the battery managing module 12 reaches the cut-off current value, when the voltage (voltage difference between positive and negative) of the battery reaches the cut-off voltage value, or when a state of charge of the battery reaches the cut-off state of charge, the controller 11 controls the battery managing module 12 to stop charging the battery, i.e., cutting off the charging. The cut-off voltage value, the cut-off current value and the cut-off state of charge for the battery may be derived by the test procedure using the abovementioned three-electrode cells and by examining the cathode of the three-electrode cells to see if lithium extraction happens, so as to ensure that the electric energy stored in the battery which is fully charged using the proposed charging method matches the electric energy stored in the battery which is fully charged using the conventional charging method, and to ensure that lithium extraction does not happen to the cathode of the battery.

Additionally, it is noted that a value of the first-stage current, the first-stage voltage value, the corresponding one of the $i^{th}$ current value, the $i^{th}$ voltage value and the $i^{th}$ power value for the $i^{th}$ charging sub-stage in the first stage and the second stage, the second-stage voltage value, and the corresponding one of the cut-off voltage value, the cut-off current value and the cut-off state of charge may be pre-stored in the battery.

Figure 4:
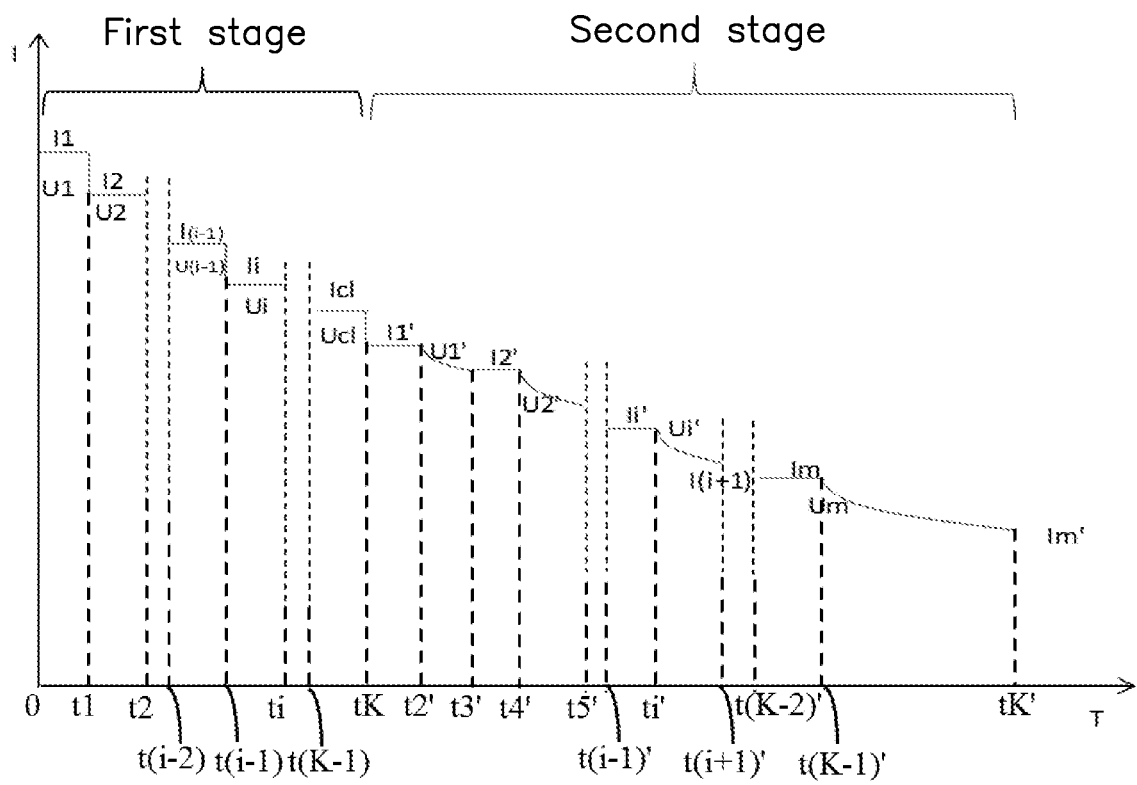
FIG. 4 is a schematic diagram of changes in current and voltage of a battery over time during charging process according to embodiment one of the present applications.

Referring to FIG. 4, in the first stage, charging the battery is performed by the first charging mode which includes K charging sub-stages sequentially, the K is an integer greater than or equal to 2, and the K charging sub-stages may be set as $i^{th}$ charging sub-stage, i=1, 2, . . . , K. In the $i^{th}$ charging sub-stage of the first stage, charging the battery with the $i^{th}$ current. In the second stage, charging the battery is performed by the second charging mode which includes K charging sub-stages sequentially, the K is an integer greater than or equal to 2, and the K charging sub-stages may be set as $i^{th}$ charging sub-stage, i=1, 2, . . . , K. The controller 11 may charge the battery with the $i^{th}$ current in the $i^{th}$ charging sub-stage of the second stage. The controller 11 may charge the battery with the $i^{th}$ voltage in the $(i+1)^{th}$ charging sub-stage of the second stage. In the $(i+2)^{th}$, $(i+3)^{th}$, K charging sub-stages, the controller 11 may charge the battery in this alternating manner.

In the first stage, from time 0 to time t0, the controller 11 controls the battery management module 12 to charge the battery at a current value I1 until the voltage of the battery reaches a voltage value U1. From time t1 to time t2, the charging is performed at a current value I2 until the voltage of the battery reaches a voltage value U2. From time t(i−2) to time t(i−1), the charging is performed at a current value I(i−1) until the voltage of the battery reaches a voltage value U(i−1). From time t(i−1) to time $t_1$, the charging is performed at a current value Ii until the voltage of the battery reaches a voltage value Ui. From time t(K−1) to time tK, the charging is performed at a current value Id until the voltage of the battery reaches a voltage value Ucl. From time t2 to time t(i−2), and from time ti to time t(K−1), the charging is performed in a similar manner, so details thereof are not plotted in FIG. 4 for the sake of clarity.

In the second stage, from time t1' to time t2', the controller 11 controls the battery managing module 12 to charge the battery at a current value I1' until the voltage of the battery reaches voltage value U1'. From time t2' to time t3', the charging is performed at a constant voltage value U1' until the current of the battery decreases from I1' to I2'. From time t3' to time t4', the charging is performed at a constant current value I2' until the voltage of the battery reaches value U2'. From time t4' to time t5', the charging is performed at a constant voltage value U2'. From time t(i−1)' to time ti', the charging is performed at a constant current value Ii' until the voltage of the battery reaches voltage value Ui'. From time ti' to time t(i+1)', the charging is performed at a constant voltage value Ui' until the current of the battery decreases from Ii' to I(i+1)'. From time t(K−2)' to time t(K−1)', the charging is performed at a constant current value Im until the voltage of the battery reaches voltage value Um. From time t(i−1)' to time ti', the charging is performed at a constant current value Ii' until the voltage of the battery reaches a voltage value Ui'. From time t(K−1)' to time tK', the charging is performed at a constant voltage value Um until the current of the battery decreases from Im to Im'. And from time t5' to time t(i−1)', and from tine t(i+1)' to time t(K−1)', the charging is performed in a similar manner, so details thereof are not plotted in FIG. 4 for the sake of clarity.

It is noted that, the time tK is the same as the time t1'. Each charging sub-stage of the K charging sub-stages of the first stage, the charging is performed at a constant current value, and I1≥I2≥ . . . ≥Icl, and U1≤U2≤ . . . ≤Ucl. Every second charging sub-stage of the K charging sub-stages of the second stage, the charging is performed at a constant current value alternating with a constant voltage value, and Icl≥I1'≥ . . . ≥Im', and Ucl≤U1'≤U2'≤ . . . ≤Um.

Figure 5:
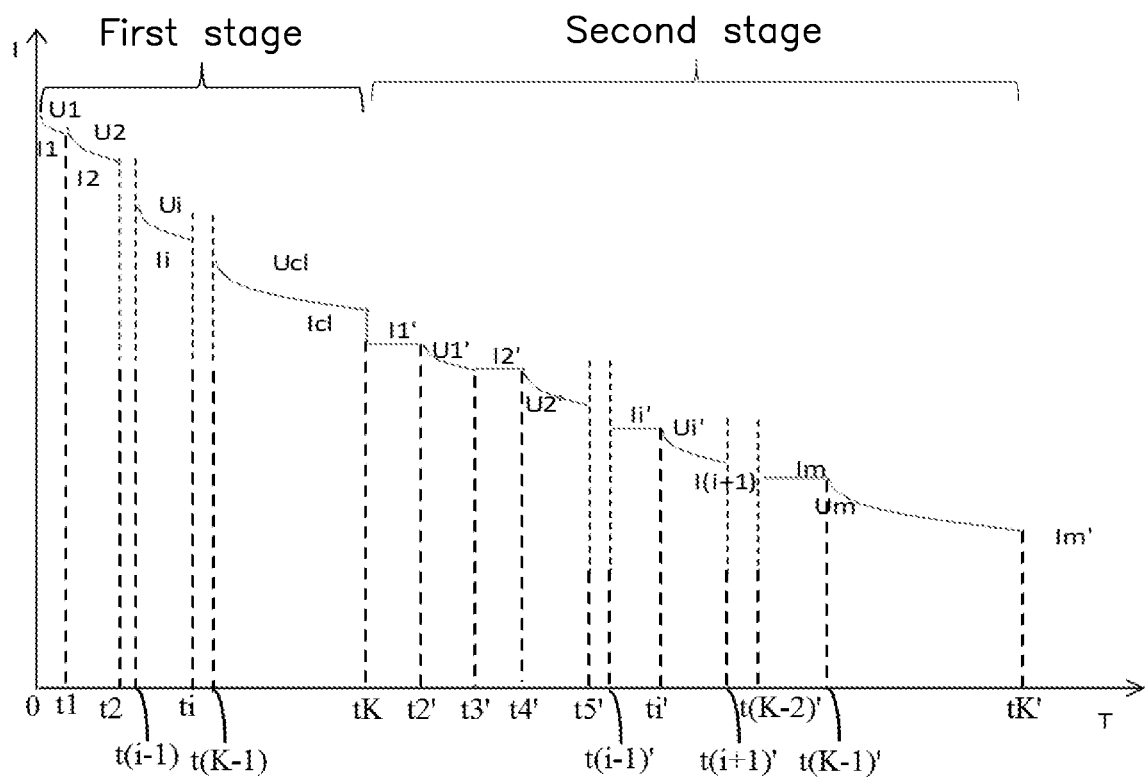
FIG. 5 is a schematic diagram of changes in current and voltage of a battery over time during charging process according to embodiment two of the present application.

Referring to FIG. 5, in the first stage, charging the battery is performed by the first charging mode which includes K charging sub-stages sequentially, the K is an integer greater than or equal to 2, and the K charging sub-stages may be set as $i^{th}$ charging sub-stage, i=1, 2, . . . , K. In the $i^{th}$ charging sub-stage of the first stage, charging the battery with the $i^{th}$ voltage. In the second stage, charging the battery is performed by the second charging mode which includes K charging sub-stages, and the K charging sub-stages may be set as $i^{th}$ charging sub-stage, i=1, 2, ..., K. The controller 11 may charge the battery with the $i^{th}$ current in the $i^{th}$ charging sub-stage of the second stage. The controller 11 may charge the battery with the $i^{th}$ voltage in the $(i+1)^{th}$ charging sub-stage of the second stage. In the $(i+2)^{th}$, $(i+3)^{th}$, K charging sub-stages, the controller 11 may charge the battery alternately in this manner.

In the first stage, from time 0 to time t0, the controller 11 controls the battery management module 12 to charge the battery at a voltage value U1 until the current of the battery reaches current value I1. From time t1 to time t2, the charging is performed at a voltage value U2 until the current of the battery reaches current value I2. From time t(i−1) to time ti, the charging is performed at a voltage value Ui until the current of the battery reaches current value Ii. From time t(K−1) to time tK, the charging is performed at a current value Ii until the voltage of the battery reaches voltage value Ui. From time t(K−1) to time tK, the charging is performed at a voltage value Ucl until the current of the battery reaches current value Id. From time t2 to time t(i−1), and from time ti to time t(K−1), the charging is performed in a similar manner, so details thereof are not plotted in FIG. 5 for the sake of clarity.

In the second stage, from time t1' to time t2', the controller 11 controls the battery management module 12 to charge the battery at a current value I1' until the voltage of the battery reaches voltage value U1'. From time t2' to time t3', the charging is performed with the voltage value U1' until the current of the battery decreases from the current value I1' to a current value I2'. From time t3' to time t4', the charging is performed with the current value I2' until the voltage of the battery reaches voltage value U2'. From time t4' to time t5', the charging is performed with the voltage value U2'. From time t(i−1)' to time ti', the charging is performed with a current value Ii' until the voltage of the battery reaches voltage value Ui'. From time ti' to time t(i+1)', the charging is performed with the voltage value Ui' until the current of the battery decreases from the current value Ii' to a current value I(i+1)'. From time t(K−2)' to time t(K−1)', the charging is performed with a current value Im until the voltage of the battery reaches voltage value Um. From time t(i−1)' to time ti', the charging is performed at a constant current value Ii' until the voltage of the battery reaches voltage value Ui'. From time t(K−1)' to time tK', the charging is performed at a constant voltage value Um until the current of the battery decreases from a current value Im to a current value Im'. And from time t5' to time t(i−1)', and from tine t(i+1)' to time t(K−1)', the charging is performed in a similar manner, so details thereof are not plotted in FIG. 5 for the sake of clarity.

It is noted that, the time tK is the same as the time t1'. During each charging sub-stage of the K charging sub-stages of the first stage, the charging is performed at a constant voltage value, and U1≤U2≤ ... ≤Ucl, and I1≥I2≥ ... ≥Icl. For every second charging sub-stage of the K charging sub-stages of the second stage, the charging is performed at a constant current value and a constant voltage value alternately, and Ucl≤U1'≤U2'≤ ... ≤Um and Icl≥I1'≥I2'≥ ... ≥Im'.

Figure 6:
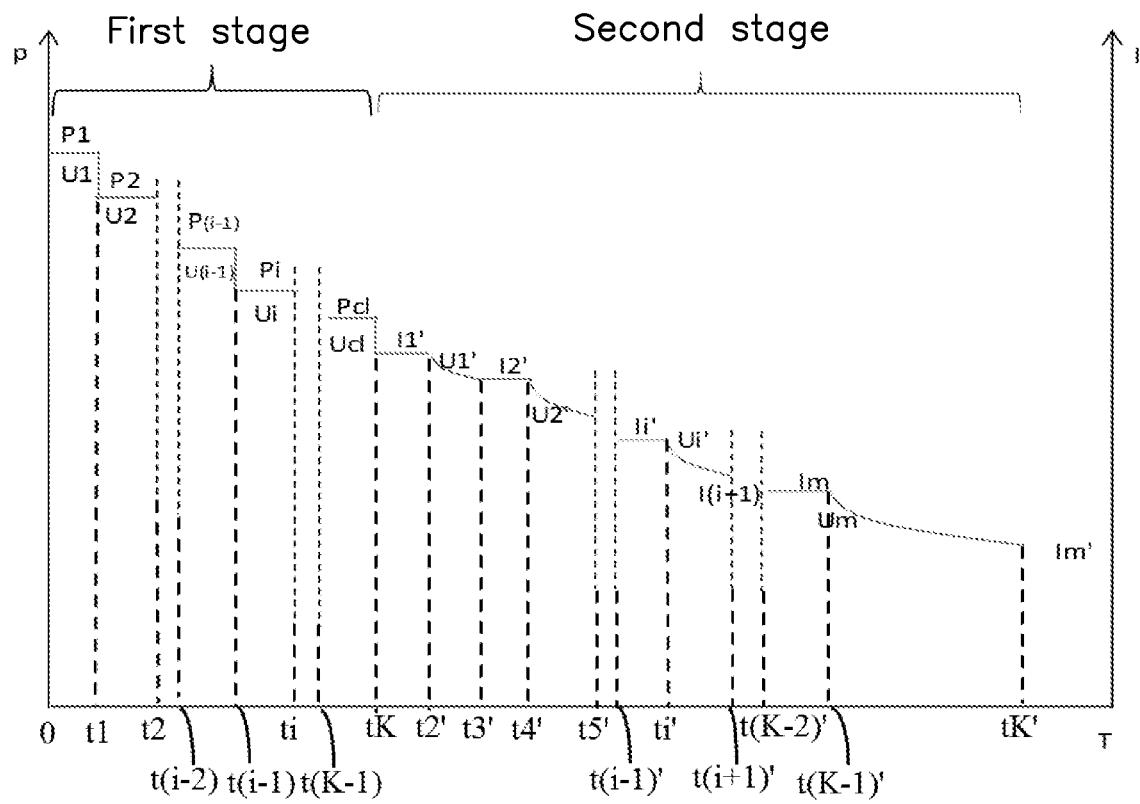
FIG. 6 is a schematic diagram of power and voltage time-changes in a first stage and current and voltage time-changes in a second stage according to an embodiment of the present application.

Referring to FIG. 6, in the first stage, using the first charging mode to charge the battery, and the first charging mode may include K charging sub-stages sequentially, the K is an integer greater than or equal to 2, and the K charging sub-stages may be set as $i^{th}$ charging sub-stage, i=1, 2, ..., K. In the $i^{th}$ charging sub-stage of the first stage, charging the battery with the $i^{th}$ power. In the second stage, using the second charging mode to charge the battery, and the second charging mode may include K charging sub-stages, and the K charging sub-stages may be set as $i^{th}$ charging sub-stage, i=1, 2, ..., K. The controller 11 may charge the battery with the $i^{th}$ current in the $i^{th}$ charging sub-stage of the second stage. The controller 11 may charge the battery with the $i^{th}$ voltage in the $(i+1)^{th}$ charging sub-stage of the second stage. In the $(i+2)^{th}$, $(i+3)^{th}$, K charging sub-stages, the controller 11 may charge the battery alternately in this manner.

In the first stage, from time 0 to time t0, the controller 11 controls the battery management module 12 to charge the battery at a power value P1 until the voltage of the battery reaches voltage value U1. From time t1 to time t2, the charging is performed at a power value P2 until the voltage of the battery reaches a voltage value U2. From time t(i−2) to time t(i−1), the charging is performed at a power value P(i−1) until the voltage of the battery reaches a voltage value U(i−1). From time t(i−1) to time $t_1$, the charging is performed at a power value Pi until the voltage of the battery reaches a voltage value Ui. From time t(K−1) to time tK, the charging is performed at a power value Pcl until the voltage of the battery reaches a voltage value Ucl. From time t2 to time t(i−2), and from time ti to time t(K−1), the charging is performed in a similar manner, so details thereof are not plotted in FIG. 6 for the sake of clarity.

In the second stage, from time t1' to time t2', the controller 11 controls the battery managing module 12 to charge the battery at a current value I1' until the voltage of the battery reaches voltage value U1'. From time t2' to time t3', the charging is performed at a constant voltage value U1' until the current of the battery decreases from I1' to I2'. From time t3' to time t4', the charging is performed at a constant current value I2' until the voltage of the battery reaches voltage value U2'. From time t4' to time t5', the charging is performed at a constant voltage value U2'. From time t(i−1)' to time ti', the charging is performed at a constant current value Ii' until the voltage of the battery reaches voltage value Ui'. From time ti' to time t(i+1)', the charging is performed at a constant voltage value Ui' until the current of the battery decreases from Ii' to I(i+1)'. From time t(K−2)' to time t(K−1)', the charging is performed at a constant current value Im until the voltage of the battery reaches voltage value Um. From time t(i−1)' to time ti', the charging is performed at a constant current value Ii' until the voltage of the battery reaches voltage value Ui'. From time t(K−1)' to time tK', the charging is performed at a constant voltage value Um until the current of the battery decreases from the current value Im to current value Im'. And from time t5' to time t(i−1)', and from time t(i+1)' to time t(K−1)', the charging is performed in a similar manner, so details thereof are not plotted in FIG. 6 for the sake of clarity.

It is noted that, for each charging sub-stage of the K charging sub-stages of the first stage, the charging is performed at a constant power value, and P1≥P2≥ ... ≥Pcl, and U1≤U2≤ ... ≤Ucl. For every second charging sub-stage of the K charging sub-stages of the second stage, the charging is performed at a constant current value and a constant voltage value alternately, and Ucl≤U1'≤U2'≤ ... ≤Um and Icl≥I1'≥I2'≥ ... ≥Im'.

Figure 7:
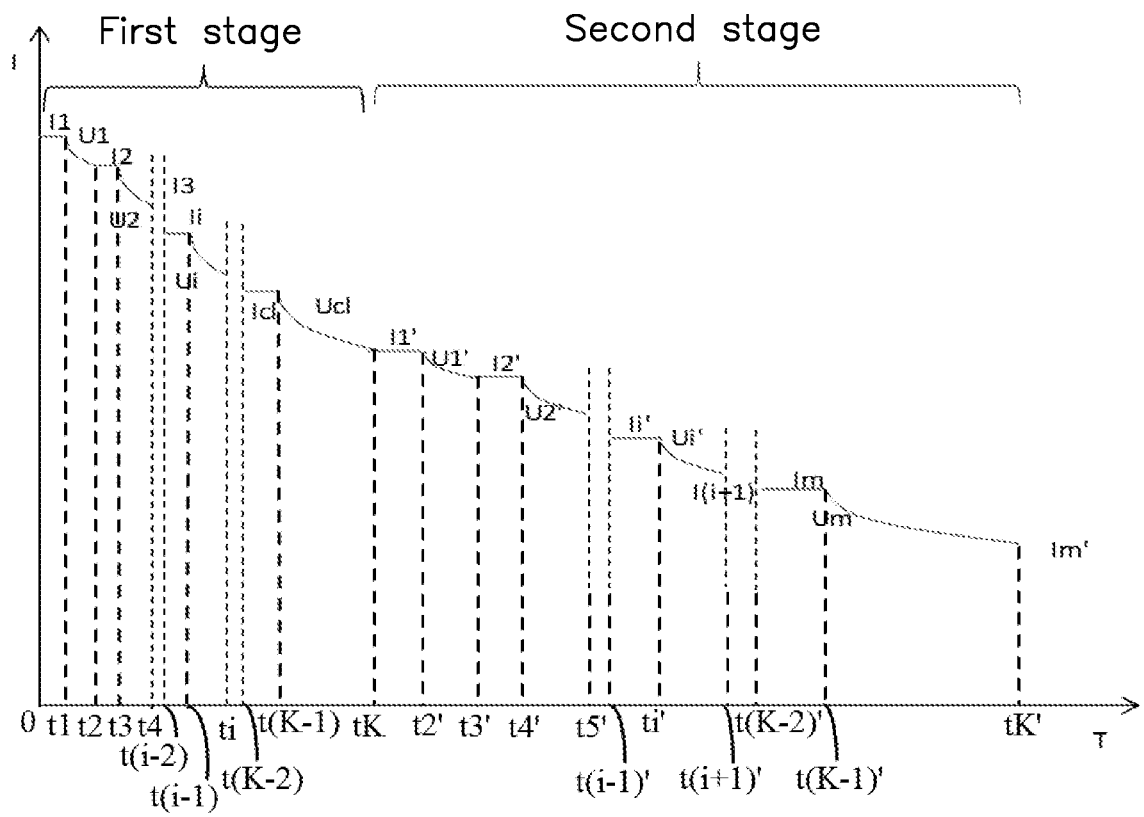
FIG. 7 is a schematic diagram of time-changes in current and voltage of a battery during charging process according to embodiment three of the present application.

Referring to FIG. 7, charging the battery is performed by the first charging mode which includes K charging sub-stages sequentially, the K is an integer greater than or equal to 2, and the K charging sub-stages may be set as $i^{th}$ charging sub-stage, i=1, 2, ..., K. In the $i^{th}$ charging sub-stage of the first stage, the controller 11 may charge the battery with the $i^{th}$ current, and in the $(i+1)^{th}$ charging sub-stage of the first stage, the controller 11 may charge the battery with the $i^{th}$ voltage. In the second stage, charging the battery is performed by the second charging mode which includes K charging sub-stages sequentially, and the K charging sub-stages may be set as $i^{th}$ charging sub-stage, i=1, 2, . . . , K. The controller 11 may charge the battery with the $i^{th}$ current in the $i^{th}$ charging sub-stage of the second stage. The controller 11 may charge the battery with the $i^{th}$ voltage in the $(i+1)^{th}$ charging sub-stage of the second stage. In the $(i+2)^{th}$, $(i+3)^{th}$, and K charging sub-stages, the controller 11 may charge the battery alternately.

In the first stage, from time 0 to time t0, the controller 11 controls the battery management module 12 to charge the battery at a current value I1 until the voltage of the battery reaches voltage value U1. From time t1 to time t2, the charging is performed at a voltage value U1 until the current of the battery decreases from a current value I1 to a current value I2. From time t2 to time t3, the charging is performed at a current value I2 until the voltage of the battery reaches voltage value U2. From time t3 to time t4, the charging is performed at a voltage value U2 until the current of the battery decreases from a current value I2 to a current value I3. From time t(i−2) to time t(i−1), the charging is performed at a current value Ii until the voltage of the battery reaches voltage value Ui. From time t(i−1) to time $t_1$, the charging is performed at a voltage value Ucl. From time t(K−1) to time tK, the charging is performed at a voltage value Ucl until the current of the battery decreases from a current value Id to a current value I1'. From time t4 to time t(i−2), and from time ti to time t(K−2), the charging is performed in a similar manner, so details thereof are not plotted in FIG. 7 for the sake of clarity.

In the second stage, from time t1' to time t2', the controller 11 controls the battery management module 12 to charge the battery at a current value I1' until the voltage of the battery reaches voltage value U1'. From time t2' to time t3', the charging is performed at a constant voltage value U1' until the current of the battery decreases from I1' to I2'. From time t3' to time t4', the charging is performed at a constant current value I2' until the voltage of the battery reaches voltage value U2'. From time t4' to time t5', the charging is performed at a constant voltage value U2'. From time t(i−1)' to time ti', the charging is performed at a constant current value Ii' until the voltage of the battery reaches voltage value Ui'. From time ti' to time t(i+1)', the charging is performed at a constant voltage value Ui' until the current of the battery decreases from a current value Ii' to a current value I(i+1)'. From time t(K−2)' to time t(K−1)', the charging is performed at a constant current value Im until the voltage of the battery reaches voltage value Um. From time t(K−1)' to time tK', the charging is performed at a constant voltage value Um until the current of the battery decreases from the current value Im to a current value Im'. And from time t5' to time t(i−1)', and from tine t(i+1)' to time t(K−2)', the charging is performed in a similar manner, so details thereof are not plotted in FIG. 7 for the sake of clarity.

It is noted that, for every second charging sub-stage of the K charging sub-stages of the first stage, the charging is performed at a constant current and a constant voltage alternatively, and I1≥I2≥ . . . ≥Icl and U1≤U2≤ . . . ≤Ucl. Every two charging sub-stages of the K charging sub-stages of the second stage, the charging is performed at a constant current and a constant voltage alternately, and Icl≥I1'≥I2'≥ . . . ≥Im' and Ucl≤U1'≤U2'≤ . . . ≤Um. Icl≥I1' and Ucl≤U1'.

If charging the battery using the second charging mode, the first stage may include D charging sub-stages sequentially, and D is an integer greater than or equal to 2, and the D charging sub-stages may be set as $j^{th}$ charging sub-stages, j=1, 2, . . . , D. Each of the $j^{th}$ charging sub-stages of the first stage may include a first $j^{th}$ charging sub-stage and a second $j^{th}$ charging sub-stage. The second stage also may include D charging sub-stages sequentially, and D is an integer greater than or equal to 2, and the D charging sub-stages may be set as PI charging sub-stages, j=1, 2, . . . , D. Each of the $j^{th}$ charging sub-stages of the second stage may include a first $j^{th}$ charging sub-stage and a second PI charging sub-stage. It is noted that the number D of the charging sub-stages in the first stage may be the same as or different from that in the second stage.

In one of the first $j^{th}$ charging sub-stage or the second $j^{th}$ charging sub-stage, the battery is not charged, or the battery is charged or discharged at a first $j^{th}$ charging sub-stage current value for a time duration Tj1. In the other one of first $j^{th}$ charging sub-stage and the second $j^{th}$ charging sub-stage, the battery is charged at a second $j^{th}$ charging sub-stage current value for a time duration Tj2. An absolute value of the first PI charging sub-stage current value is less than an absolute value of the second $j^{th}$ charging sub-stage current value.

In other words, in each of the charging sub-stages, the battery is charged in a pulse-like manner. An average of the current value of the $(j+1)^{th}$ charging sub-stage is less than an average of the current value of the $j^{th}$ charging sub-stage, i.e., (first $1^{th}$ charging sub-stage current value×T11+second $1^{th}$ charging sub-stage current value×T12)/(T11+T12) is greater than or equal to (first $2^{th}$ charging sub-stage current value×T21+second $2^{th}$ charging sub-stage current value× T22)/(T21+T22), (first $2^{th}$ charging sub-stage current value× T21+second $2^{th}$ charging sub-stage current value×T22)/ (T21+T22) is greater than or equal to (first $3^{th}$ charging sub-stage current value×T31+second $3^{th}$ charging sub-stage current value×T32)/(T31+T32) so on and so forth. A sum of Tj1 and Tj2 is a period of a charge cycle or a discharge and charge cycle of the $j^{th}$ charging sub-stage.

In addition, it is important to add that: in this embodiment, the battery is charged or discharged with the first $j^{th}$ charging sub-stage current value for the time duration Tj1 in the first $j^{th}$ charging sub-stage, and charged with the second $j^{th}$ charging sub-stage current value for the time duration Tj2 in the second $j^{th}$ charging sub-stage. In one embodiment, the battery is charged or discharged with the first $j^{th}$ charging sub-stage current value for the time duration Tj2 in the first $j^{th}$ charging sub-stage, and charged or discharged with the second $j^{th}$ charging sub-stage current value for the time duration Tj1 in the second $j^{th}$ charging sub-stage. In one embodiment, the battery may be neither charged nor discharged (i.e., no current flows in or out of the battery, e.g., the battery is left undisturbed) for the time duration Tj1 in the first $j^{th}$ charging sub-stage, and be charged or discharged at the second $j^{th}$ charging sub-stage current value for the time duration Tj2 in the second $j^{th}$ charging sub-stage.

Figure 8:
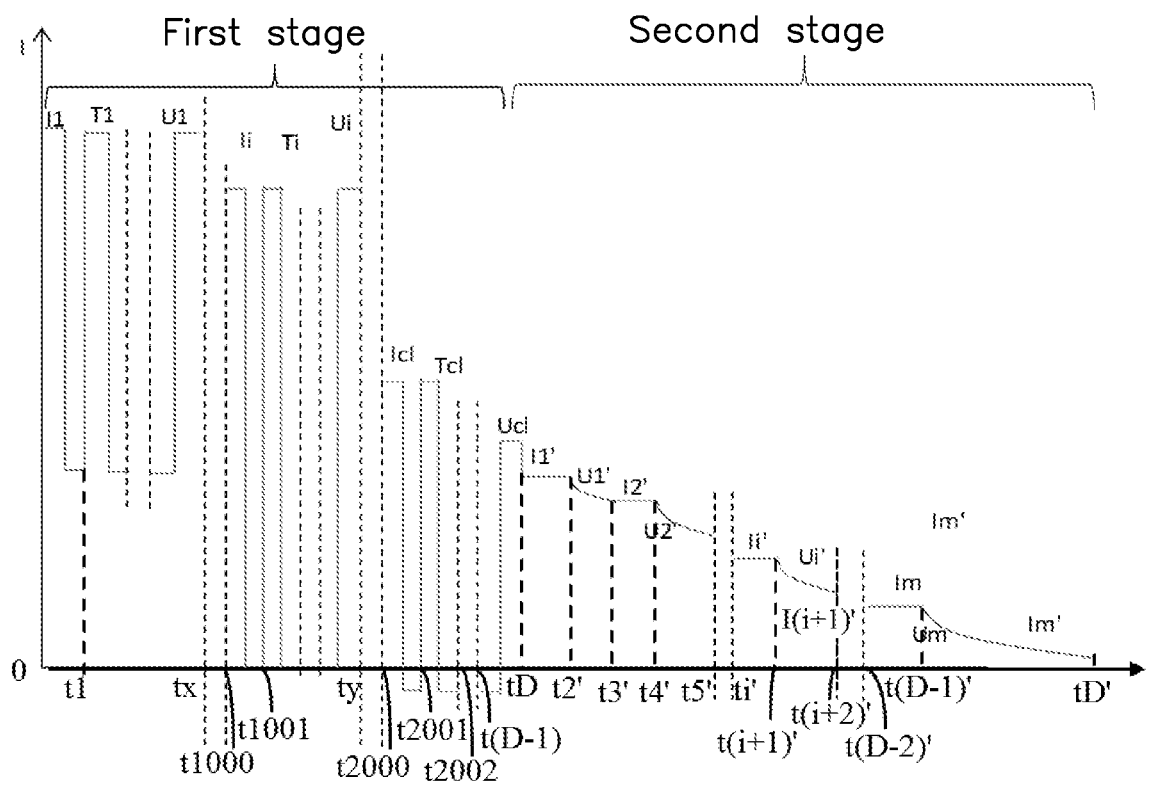
FIG. 8 is a schematic diagram of time-changes in current and voltage of a battery during charging process according to embodiment four of the present application.

Referring to FIG. 8, from time t1 to time t1000, that is each charging sub-stage from the $1^{th}$ charging sub-stage to $1000^{th}$ charging sub-stage of the first stage, the battery is charged with a current value I2 first, then the battery is charged with a current value I3. And from time tx to time t1000, the charging is performed in a similar manner, so details thereof are not plotted in FIG. 8 for the sake of clarity.

From time t1000 to time t2000, that is each charging sub-stage from the $1001^{th}$ charging sub-stage to $2000^{th}$ charging sub-stage of the first stage, the battery is charged with a current value I10011 first, then the battery is left undisturbed (i.e., the battery may be neither charged nor discharged). From time ty to time t2000, the charging is performed in a similar manner, so details thereof are not plotted in FIG. 8. From time t2000 to time tD, that is each charging sub-stage from the $2001^{th}$ charging sub-stage to $D^{th}$ charging sub-stage of the first stage, the battery is charged with a current value I20011 first, then the battery is charged with a current value I20012 until the voltage of the battery reaches the voltage value Uc1 (i.e., the cut-off voltage value). And from time t2002 to time t(D−1), the charging is performed in a similar manner, so details thereof are not plotted in FIG. 8 for the sake of clarity.

In other words, the D charging sub-stages of the first stage are classified into three different pulsating charging or pulsating charging-discharging sections for charging the battery. In this implementation, each pulsating charging or pulsating charging-discharging sections of the charging sub-stages has the same time duration, namely, t1=(t1001−t1000)=(t2001−t2000). In other embodiments, different pulsating charging or pulsating charging-discharging sections of the charging sub-stages may have the same or different time durations.

In the second stage, from time t1' to time t2', the controller 11 controls the battery management module 12 to charge the battery at a current value I1' until the voltage of the battery reaches to a voltage value U1'. From time t2' to time t3', the charging is performed at a constant voltage value U1' until the current of the battery decreases from the current value I1' to a current value I2'. From time t3' to time t4', the charging is performed at the constant current value I2' until the voltage of the battery reaches voltage value U2'. From time t4' to time t5', the charging is performed with the constant voltage value U2'. From time ti' to time t(i+1)', the charging is performed at a constant current value Ii' until the voltage of the battery reaches voltage value Ui'. From time t(i+1)' to time t(i+2)', the charging is performed at the constant voltage value Ui' until the current of the battery decreases from the current value Ii' to a current value I(i+1)'. From time t(D−2)' to time t(D−1)', the charging is performed at a constant current value Im until the voltage of the battery reaches voltage value Um. From time t(D−1)' to time tD', the charging is performed at the constant voltage value Um until the current of the battery decreases from the current value Im to a current value Im'. And from time t5' to time ti', and from tine t(i+2)' to time t(D−2)', the charging is performed in a similar manner, so details thereof are not plotted in FIG. 8 for the sake of clarity.

In summary, the method for improving the cycling performance of the battery of the present application combines using the high-adhesion separator in the battery, and increasing the charge limiting voltage of the battery (i.e., increasing the voltage from the first stage voltage to the second stage voltage). The method can shorten a time that the cathode of the battery is kept at a high potential and reduce the occurrence of side reactions, thereby improving the cycling performance of the battery. In addition, the method can combine with a high-adhesion separator, which can increase pressure of pores in the positive and negative electrodes, and suppress bloating of the battery cell after the voltage rises. The method also can reduce an interface reaction rate between a cathode and an electrolyte of the battery and further can suppress the occurrence of side reactions, thereby significantly improving the cycling performance of the battery in the high temperature environment.

This disclosure is made with reference to the accompanying drawings and embodiments. It should be understood that the examples given in this specification are only for explaining this application, and are not intended to limit this application, and this application is not limited to the examples given in this specification.

The batteries of the comparative embodiments and embodiments described below include a cathode composed of $LiCoO_2$, and an anode composed of graphite, a separator, an electrolyte, and a housing. And a process of producing the batteries includes the steps of mixing, coating, assembling, formatting, aging, etc. The cathode is made by mixing 96.7% $LiCoO_2$ (as an active material of the cathode), 1.7% polyvinylidene fluoride (PVDF, as a binder), and 1.6% conductive carbon black (SUPER-P, as a binder). The anode is made by mixing 98% artificial graphite (as an active material of the anode), 1.0% styrene-butadiene rubber (SBR, as a binder), and 1.0% sodium carboxymethyl cellulose (SCMC, as a thickener).

The comparative embodiments and the embodiments use different new charging methods to charge the battery, and combine the separator with different adhesion to improve the cycling performance of the battery. A capacity retention rate and gas production of the battery cell are calculated after the battery is charged and discharged for 500 times under environment temperature at 55 Celsius. The programs and results are summarized in Table 1. The separator is a low-adhesion separator of the comparative embodiments 1 and 2, and the separator is a high-adhesion separator of the embodiments 1-26. In at least one embodiment, a bonding force between the separator and the positive electrode and the negative electrode is less than 3 N/m.

| | | | | | | | | |
|---|---|---|---|---|---|---|---|---|
| | | | | | | 1-26 | | |

| Program | substrate | polymer adhesive layer | particle size | coverage area ratio | bonding force to the anode | Charging method (see the comparative embodiment and embodiment in details) | Gas production of the battery cell | Capacity retention rate |
|---|---|---|---|---|---|---|---|---|
| Comparative Embodiment 1 | Polyethylene | PVDF | 100 nm | 30% | 1.0 N/m | conventional charging method | 81 ml | 51% |
| Comparative Embodiment 2 | Polyethylene | PVDF | 100 nm | 30% | 1.0 N/m | new charging method 1 | 78 ml | 56% |
| Comparative Embodiment 3 | Polyethylene | Polyacrylic acid | 100 nm | 30% | 4.3 N/m | conventional charging method | 53 ml | 57% |
| Embodiment 1 | Polyethylene | Polyacrylic acid | 500 nm | 15% | 3.0 N/m | new charging method 1 | 62 ml | 71% |

-continued 1-26

| Program | substrate | polymer adhesive layer | particle size | coverage area ratio | bonding force to the anode | Charging method (see the comparative embodiment and embodiment in details) | Gas production of the battery cell | Capacity retention rate |
|---|---|---|---|---|---|---|---|---|
| Embodiment 2 | Polyethylene | Polyacrylic acid | 500 nm | 20% | 3.7 N/m | new charging method 1 | 58 ml | 72% |
| Embodiment 3 | Polyethylene | Polyacrylic acid | 500 nm | 30% | 4.3 N/m | new charging method 1 | 53 ml | 75% |
| Embodiment 4 | Polyethylene | Polyacrylic acid | 500 nm | 40% | 5.2 N/m | new charging method 1 | 49 ml | 78% |
| Embodiment 5 | Polyethylene | Polyacrylic acid | 500 nm | 50% | 6.6 N/m | new charging method 1 | 46 ml | 80% |
| Embodiment 6 | Polyethylene | Polyacrylic acid | 500 nm | 60% | 8.7 N/m | new charging method 1 | 43 ml | 82% |
| Embodiment 7 | Polyethylene | Polyacrylic acid | 500 nm | 70% | 10.1 N/m | new charging method 1 | 39 ml | 83% |
| Embodiment 8 | Polyethylene | Polyacrylic acid | 500 nm | 80% | 11.3 N/m | new charging method 1 | 37 ml | 85% |
| Embodiment 9 | Polyethylene | Polyacrylic acid | 500 nm | 85% | 12 N/m | new charging method 1 | 36 ml | 86% |
| Embodiment 10 | Polypropylene | Polyacrylic acid | 500 nm | 50% | 6.4 N/m | new charging method 1 | 41 ml | 82% |
| Embodiment 11 | PET | Polyacrylic acid | 500 nm | 50% | 6.3 N/m | new charging method 1 | 43 ml | 81% |
| Embodiment 12 | Cellulose | Polyacrylic acid | 500 nm | 50% | 6.5 N/m | new charging method 1 | 42 ml | 80% |
| Embodiment 13 | Polyimide | Polyacrylic acid | 500 nm | 50% | 6.4 N/m | new charging method 1 | 42 ml | 79% |
| Embodiment 14 | Polyethylene | Polyvinylidene fluoride | 500 nm | 50% | 6.2 N/m | new charging method 1 | 42 ml | 79% |
| Embodiment 15 | Polyethylene | Styrene-butadiene copolymer | 500 nm | 50% | 6.5 N/m | new charging method 1 | 43 ml | 81% |
| Embodiment 16 | Polyethylene | Polyacrylonitrile | 500 nm | 50% | 6.3 N/m | new charging method 1 | 41 ml | 81% |
| Embodiment 17 7 | Polyethylene | Polyacrylate | 500 nm | 50% | 6.1 N/m | new charging method 1 | 39 ml | 78% |
| Embodiment 18 | Polyethylene | Acrylate-styrene copolymer | 500 nm | 50% | 6.3 N/m | new charging method 1 | 40 ml | 79% |
| Embodiment 19 | Polyethylene | Polyacrylic acid | 200 nm | 50% | 4.4 N/m | new charging method 1 | 49 ml | 72% |
| Embodiment 20 | Polyethylene | Polyacrylic acid | 300 nm | 50% | 4.9 N/m | new charging method 1 | 47 ml | 76% |
| Embodiment 21 | Polyethylene | Polyacrylic acid | 1000 nm | 50% | 7.8 N/m | new charging method 1 | 42 ml | 81% |
| Embodiment 22 | Polyethylene | Polyacrylic acid | 2000 nm | 50% | 10.9 N/m | new charging method 1 | 37 ml | 83% |
| Embodiment 23 | Polyethylene | Polyacrylic acid | 500 nm | 50% | 6.6 N/m | new charging method 2 | 45 ml | 81% |

-continued 1-26

| Program | substrate | polymer adhesive layer | particle size | coverage area ratio | bonding force to the anode | Charging method (see the comparative embodiment and embodiment in details) | Gas production of the battery cell | Capacity retention rate |
|---|---|---|---|---|---|---|---|---|
| Embodiment 24 | Polyethylene | Polyacrylic acid | 500 nm | 50% | 6.5 N/m | new charging method 3 | 43 ml | 81% |
| Embodiment 25 | Polyethylene | Polyacrylic acid | 500 nm | 50% | 6.7 N/m | new charging method 4 | 41 ml | 80% |
| Embodiment 26 | Polyethylene | Polyacrylic acid | 500 nm | 50% | 6.6 N/m | new charging method 5 | 42 ml | 82% |

The conventional charging method of the comparative embodiments 1 and 3 is a constant current and constant voltage charging method of the existing technology. A conventional charging process is as follows:

The environment temperature of the battery is 55 Celsius as an example:
  Step one: performing constant current charging with a current of 0.7 C until a voltage of the battery is 4.4V;
  Step two: performing constant voltage charging with a voltage of 4.4V until a current of the battery is 0.05 C;
  Step three: letting the battery stand for 5 minutes;
  Step four: performing constant current discharging with a current of 0.5 C until a voltage of the battery is 3.0V;
  Step five: standing the battery for 5 minutes;
  Step six: repeating the step one to step five 500 times.

A new charging method 1 of the present application is adopted in the comparative embodiment 2 and embodiments 1-22. A charging process of the new charging method 1 is as follows:

The environment temperature of the battery is 55 Celsius as an example:
  Step one: performing constant current charging with a current of 0.7 C until a voltage of the battery is 4.4V;
  Step two: performing constant current charging with a current of 0.5 C until a voltage of the battery is 4.45V;
  Step three: performing constant current charging with a current of 0.4 C until a voltage of the battery is 4.54V;
  Step four: letting the battery stand for 5 minutes;
  Step five: performing constant current discharging with a current of 0.5 C until a voltage of the battery is 3.0V;
  Step six: standing the battery for 5 minutes;
  Step seven: repeating the step one to step six 500 times.

A new charging method 2 of the present application is adopted in the embodiment 23, a charging process of the new charging method 2 is as follows:

The environment temperature of the battery is 55 Celsius as an example:
  Step one: performing constant current charging with a current of 0.7 C until a voltage of the battery is 4.4V;
  Step two: performing constant voltage charging with a voltage of 4.35V until a current of the battery is 0.4 C;
  Step three: performing constant voltage charging with a voltage of 4.45V until a current of the battery is 0.13 C;
  Step four: letting the battery stand for 5 minutes;
  Step five: performing constant current discharging with a current of 0.5 C until a voltage of the battery is 3.0V;
  Step six: standing the battery for 5 minutes;
  Step seven: repeating the step one to step six 500 times.

A new charging method 3 of the present application is adopted in the embodiment 24, and a charging process of the new charging method 3 is as follows:

The environment temperature of the battery is 55 Celsius as an example:
  Step one: performing constant current charging with a current of 0.7 C (2.1A) until a voltage of the battery is 4.4V;
  Step two: performing constant power charging with a power of 7 W until a voltage of the battery is 4.45V;
  Step three: performing constant power charging with a power of 5.5 W until a voltage of the battery is 4.55V;
  Step four: letting the battery stand for 5 minutes;
  Step five: performing constant current discharging with a current of 0.5 C until a voltage of the battery is 3.0V;
  Step six: standing the battery for 5 minutes;
  Step seven: repeating the step one to step six 500 times.

A new charging method 4 of the present application is adopted in the embodiment 25, a charging process of the new charging method 4 is as follows:

The environment temperature of the battery is 55 Celsius as an example:
  Step one: performing constant current charging with a current of 0.7 C until a voltage of the battery is 4.4V;
  Step two: performing constant voltage charging with a voltage of 4.4V until a current of the battery is 0.5 C;
  Step three: performing constant current charging with a current of 0.5 C until a voltage of the battery is 4.45 C;
  Step four: performing constant voltage charging with a voltage of 4.45V until a current of the battery is 0.3 C;
  Step five: letting the battery stand for 5 minutes;
  Step six: performing constant current discharging with a current of 0.5 C until a voltage of the battery is 3.0V;
  Step seven: standing the battery for 5 minutes;
  Step eight: repeating the step one to step seven 500 times.

A new charging method 5 of the present application is adopted in the embodiment 26, a charging process of the new charging method 5 is as follows:

The environment temperature of the battery is 55 Celsius as an example:
  Step one: performing constant current charging with a current of 0.7 C until a voltage of the battery is 4.4V;
  Step two: letting the battery stand for 2.9 seconds;

Step three: performing constant current charging with a current of 0.7 C for 7.1 seconds, and determining whether a voltage of the battery is greater than or equal to 4.45V, and executing step five if the voltage of the battery is greater than or equal to 4.45V;

Step four: repeating the step two to step three 100000 times;

Step five: performing constant current discharging with a current of 0.05 C for one second;

Step six: performing constant current charging with a current of 0.41 C for 9 seconds, and determining whether a voltage of the battery is greater than or equal to 4.54V, and executing step eight if the voltage of the battery is greater than or equal to 4.54V;

Step five: letting the battery stand for 5 minutes;

Step six: performing constant current discharging with a current of 0.5 C until a voltage of the battery is 3.0V;

Step seven: standing the battery for 5 minutes;

Step eight: performing constant current discharging with a current of 0.5 C until a voltage of the battery is 3.0V;

Step nine: standing the battery for 5 minutes;

Step ten: repeating the step one to step nine 500 times.

In addition, it should be noted that a calculation method of the capacity retention rate of the battery after the battery charged and discharged for 500 times at 55 Celsius in Table 1 is as follows: when the environment temperature is 55 Celsius, performing the corresponding charging process of the comparative embodiments and the embodiments to charge the battery for 500 times, and dividing a discharge capacity of the battery after 500 times by a discharge capacity of the first time t0 obtain the capacity retention rate.

A calculation method of the battery cell gas production is as follows: when the environment temperature is 55 Celsius, putting the battery into a drain meter, and recording a weight of water growth and calculating a volume value V1 based on the weight before testing, then taking out the battery from the drain meter. Performing the corresponding charging process of the comparative embodiments and the embodiments to charge the battery for 500 times, then putting the battery into a drain meter, and calculating a volume value V2. A difference between V2 minus V1 is the gas production after the battery is charged and discharged for 500 times, and the gas production results of each comparative embodiment and each embodiment shown in Table 1.

From Table 1, it can be seen from Comparative Embodiment 2 and Comparative Embodiment 1: just performing the new charging method can increase the capacity retention rate, but not by much (about 5%). This is mainly because the new charging method can significantly shorten the full charge time and reduce the total side reaction time of the battery. However, due to gradual consumption of additives in the electrolyte of the battery in later stage of the battery is charging and discharging with high temperature, gas production of the battery decreases, so that the capacity retention rate increases slowly.

It can be seen from Comparative Embodiment 3 and Comparative Embodiment 1: using the separator having high adhesion does not significantly improve the capacity retention rate after the battery charged and discharged (about 6%). This is because although the separator can increase the pressure of the pores in the positive and negative electrodes, the cathode of the battery has a longer time under high voltage by using the conventional charging method, which has caused a certain degree of damage to the cathode material and side reactions of the battery. It will be aggravated, and the capacity retention rate will be lower due to the larger polarization at the later stage of the battery charging and discharging.

It can be seen from Embodiments 1-26 and Comparative Embodiments 2 and 3: by combining the separator and the new charging method in the battery, the gas production of the battery can be reduced while the capacity retention rate is significantly improved (up to about 35%). This is mainly because the new charging method can significantly shorten a time that the cathode of the battery is kept at a high potential and reduce the damage of the cathode of the battery, and reduce the overall reaction of the battery. In addition, by using the separator in the battery, the adhesion between the positive and negative electrodes of the battery and the separator is enhanced, and the problem of cell production caused by accelerated decomposition of the solvent or additives in the electrolysis after the voltage is raised is suppressed. And the separator can effectively reduce interlayer distances between the positive and negative electrodes and the separator, which reduces the interface reaction rate between the cathode and the electrolyte, and reduces the occurrence of local side reactions at the interface. Thus, significantly improving the cycling performance of the battery in the high temperature environment.

Therefore, the present application provides a combination method by adopting a high-adhesion separator in the battery and increasing the charge limiting voltage of the battery (for example, the charge limiting voltages of Comparative Embodiments 1 and 3 are increased from 4.4V to 4.54V, etc.), the combination method can shorten a time that the cathode of the battery is kept at a high potential and reduce the occurrence of side reactions, thereby improving the cycling performance of the battery. In addition, the method can combine with a high-adhesion separator, which can increase pressure of pores in the positive and negative electrodes, and suppress the bloating of the battery cell after the voltage rises. The method also can reduce an interface reaction rate between a cathode and an electrolyte of the battery and further can suppress the occurrence of side reactions. Then, significantly improving the cycling performance of the battery being in the high temperature environment.

Referring to FIG. 9, which is a second embodiment of the method for improving the cycling performance of a battery shown in FIG. 2. The second embodiment is similar to the first embodiment, and the second embodiment can include block S91 and block S92. The difference between the second embodiment and the first embodiment is the block S91:

In block S91, in a first stage, charging the battery with a first-stage current until a voltage of the battery reaches a first-stage voltage value. The controller can charge the battery by using a third charging mode until a voltage of the battery reaches the first-stage voltage value, and the third charging mode is the first charging mode or the second charging mode.

In at least one embodiment, the first charging mode and the second charging mode of the second embodiment are the same as the first charging mode and the second charging mode of the first embodiment.

If the third charging mode is the equivalent of the first charging mode, the number of charging sub-stages K between the two may be the same. That is, the number of charging sub-stages of the first charging mode in the first stage is equal to the number of charging sub-stages of the first charging mode in the second stage. Or if the third charging mode is the equivalent of the second charging mode, the number of charging sub-stages D between the two may be the same. That is, the number of charging sub-stages of the second charging mode in the first stage is equal to the number of charging sub-stages of the second charging mode in the second stage.

If the third charging mode is the equivalent of the first charging mode, the number of charging sub-stages K between the two may be different. That is, the number of charging sub-stages of the first charging mode in the first stage is different from the number of charging sub-stages of the first charging mode in the second stage. Or if the third charging mode is the equivalent of the second charging mode, the number of charging sub-stages D between the two may be the same. That is, the number of charging sub-stages of the second charging mode in the first stage is different from the number of charging sub-stages of the second charging mode in the second stage.

Referring to FIG. 10, a third embodiment of a method for improving the cycling performance of battery shown in FIG. 2 is shown. The third embodiment is similar to the first embodiment, and the third embodiment may include block S101 and block S102. The difference between the third embodiment and the first embodiment is the block S101 and block S102:

In block S101, in a first stage, charging the battery with a first-stage current until a voltage of the battery reaches a first-stage voltage value. The controller may charge the battery by using a third charging mode until a voltage of the battery reaches the first-stage voltage value, and the third charging mode is the first charging mode or the second charging mode.

In block S102, in a second stage, charging the battery with a second-stage current until the voltage of the battery reaches a second-stage voltage value, the second-stage voltage value is greater than the first-stage voltage value, and the second-stage current is less than the first-stage current; and charging the battery by using the first charging mode or the second charging mode until a voltage of the battery reaches the second-stage voltage value.

The battery may include a positive electrode, a negative electrode, and a separator provided between the positive electrode and the negative electrode. A bonding force between the high adhesion separator in the present application and the positive electrode is greater than or equal to 3 N/m, and/or a bonding force between the high adhesion separator in the present application and the negative electrode is greater than or equal to 3 N/m.

In at least one embodiment, the second-stage current may be the constant current which is used in the first stage of the conventional charging method. Or the second-stage current may be a varying current. For example, charging the battery with a constant voltage in the second stage, so that the current (i.e., the second-stage current) corresponding to the constant voltage will vary, just charging the battery using the second-stage current until the voltage of the battery reaches the second-stage voltage value.

Figure 11:
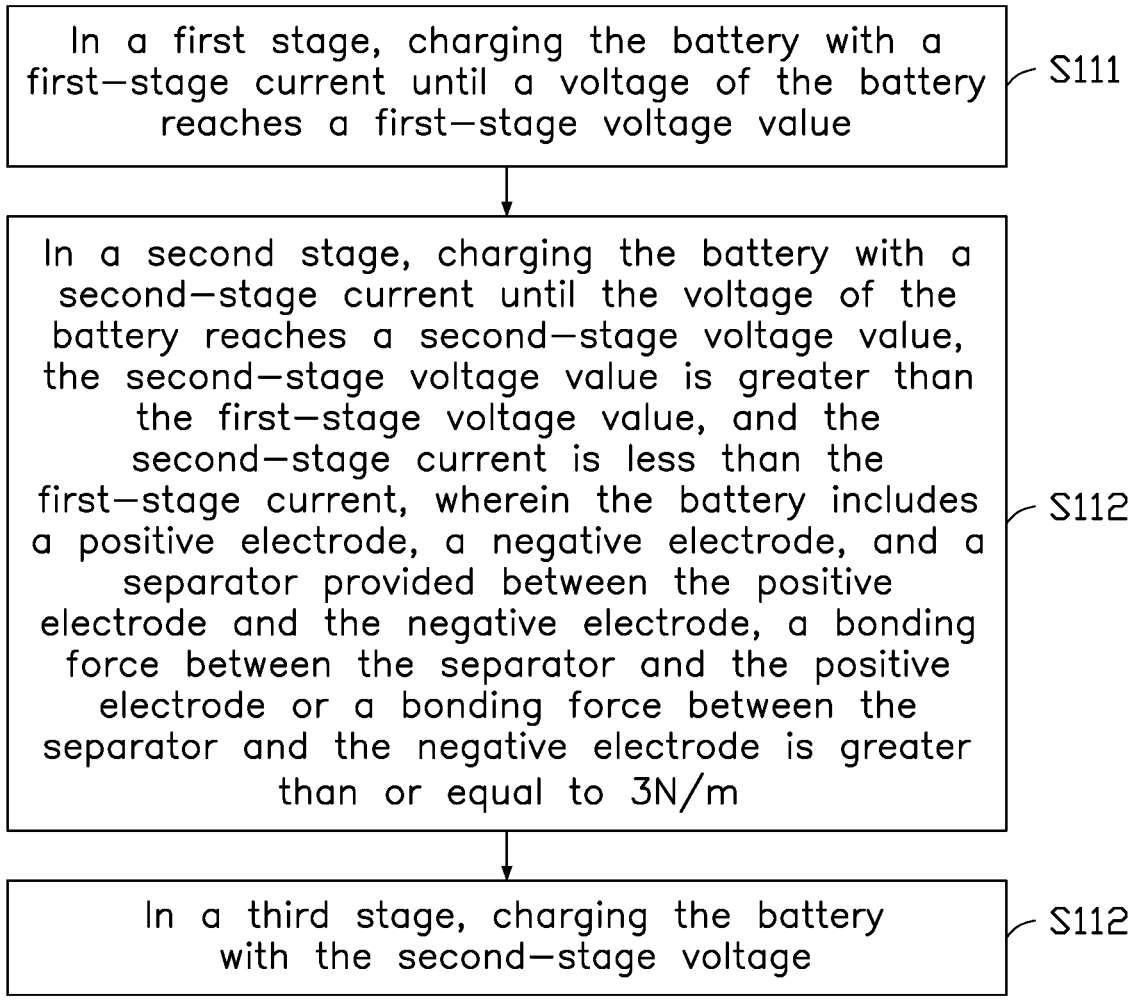
FIG. 11 is a flowchart of a fourth embodiment of a method for improving cycling performance of a battery shown in FIG. 2.

FIG. 11 shows a fourth embodiment of the method for improving the cycling performance of a battery shown in FIG. 2. The fourth embodiment is similar to the first embodiment, and the fourth embodiment may include block S111 and block S112. The difference between the fourth embodiment and the first embodiment is that the fourth embodiment further may include the block S113:

In block S113, in a third stage, charging the battery with the second-stage voltage value.

In at least one embodiment, charging the battery with the second-stage voltage until the battery is fully charged in the third stage.

In other embodiments, the second embodiment may be changed according to the fourth embodiment, that is add the block S113: in a third stage, charging the battery with the second-stage voltage value.

In other embodiments, if the second stage of the third embodiment is charging the battery with a constant current value, the third embodiment may also be changed according to the fourth embodiment, that is add the block S113: in a third stage, charging the battery with the second-stage voltage value.

A person skilled in the art knows that the present application is not limited to the details of the above exemplary embodiments, and that the present application can be implemented in other specific forms without departing from the spirit or basic features of the application. Therefore, the above-mentioned embodiments of the present application should be regarded as exemplary and non-limiting from any point of view. The scope of the present application is defined by the appended claims rather than the above description. All changes that come within the meaning and scope of equivalents of the claims are encompassed by this application.

What is claimed is:

1. A method for improving cycling performance of a battery, the method comprising:
   in a first stage, charging the battery with a first-stage current until a voltage of the battery reaches a first-stage voltage value;
   in a second stage, charging the battery with a second-stage current until the voltage of the battery reaches a second-stage voltage value, wherein the second-stage voltage value is greater than the first-stage voltage value, and the second-stage current is less than the first-stage current;
   wherein, the battery comprises a positive electrode, a negative electrode, and a separator located between the positive electrode and the negative electrode, wherein a bonding force between the separator and the positive electrode, or a bonding force between the separator and the negative electrode is greater than or equal to 3 N/m; and
   wherein the separator comprises a porous substrate, a heat-resistant layer coated on at least one surface of the porous substrate and a polymer adhesive layer; wherein the polymer adhesive layer is coated on a surface of the heat-resistant layer or a surface of the porous substrate without the heat-resistant layer coating, and the polymer adhesive layer comprises polymer particles, and a number of stack layers of the polymer particles in the polymer adhesive layer is less than or equal to four.

2. The method according to claim 1, wherein in the second stage, charging the battery by a first charging mode or a second charging mode until the voltage of the battery reaches the second-stage voltage value;
   the first charging mode comprises K charging sub-stages sequentially, K is an integer greater than or equal to 2, and the K charging sub-stages are set as $i^{th}$ charging sub-stage separately, i=1, 2, ..., K; in an $i^{th}$ charging sub-stage, charging the battery with one of an $i^{th}$ current value, and an $i^{th}$ voltage value, and an $i^{th}$ power value; in an (i+1)th charging sub-stage, charging the battery with one of an $(i+1)^{th}$ current value, and an $(i+1)^{th}$ voltage value, and an $(i+1)^{th}$ power value; wherein a charging current value of the $(i+1)^{th}$ charging sub-stage is less than or equal to a charging current value of the $i^{th}$ charging sub-stage, or the $(i+1)^{th}$ voltage value is greater than or equal to the $i^{th}$ voltage value, or the $(i+1)^{th}$ power value is less than or equal to the $i^{th}$ power value; and the second charging mode comprises D charging sub-stages sequentially, D is an integer greater than or equal to 2, and the D charging sub-stages are set as $j^{th}$ charging sub-stage separately, j=1, 2, ..., D; each of the $j^{th}$ charging sub-stage comprises a first $j^{th}$ charging sub-stage and a second $j^{th}$ charging sub-stage; in one of the first $j^{th}$ charging sub-stage or the second $j^{th}$ charging sub-stage, the battery is not charged, or the battery is charged or discharged with a first $j^{th}$ charging sub-stage current value for a time duration Tj1, and in the other one of the first $j^{th}$ charging sub-stage and the second $j^{th}$ charging sub-stage, the battery is charged with a second $j^{th}$ charging sub-stage current value for a time duration Tj2; wherein an absolute value of the first $j^{th}$ charging sub-stage current value is less than an absolute value of the second $j^{th}$ charging sub-stage current value.

3. The method according to claim 2, wherein an average of current values of the $j^{th}$ charging sub-stage is less than a current value of the first stage, and an average of current values of the $(j+1)^{th}$ charging sub-stage is less than an average of current values of the $j^{th}$ charging sub-stage.

4. The method according to claim 2, further comprising: in the first stage, charging the battery by a third charging mode until the voltage of the battery reaches the first-stage voltage value, and the third charging mode comprising the first charging mode or the second charging mode.

5. The method according to claim 4, wherein a number of charging sub-stages K of the first charging mode in the first stage is equal to a number of charging sub-stages K of the first charging mode in the second stage, and a number of charging sub-stages D of the second charging mode in the first stage is equal to a number of charging sub-stages of the second charging mode in the second stage.

6. The method according to claim 1, wherein the first-stage voltage value is equal to a charging limit voltage of the battery, and the second-stage voltage value is less than an oxidative decomposition voltage of an electrolyte of the battery.

7. The method according to claim 1, wherein the polymer particles are selected from at least one of polyvinylidene chloride, polyvinylidene-fluoride-hexafluoropropylene copolymer, styrene-butadiene copolymer, polyacrylonitrile, butadiene-acrylonitrile polymer, polyacrylic acid, polyacrylate and acrylate-styrene, or a copolymer of at least two of the above polymer monomers, and a particle size of the polymer particles is 0.2 μm-2 μm.

8. The method according to claim 1, wherein a coverage area ratio of the polymer adhesive layer on the porous substrate or on the heat-resistant layer is 15%-85%.

9. The method according to claim 1, wherein the second-stage voltage value is less than a sum of the first-stage voltage value plus 500 millivolts.

10. An electronic device comprising:
a battery comprising a positive electrode, a negative electrode, and a separator located between the positive electrode and the negative electrode, wherein a bonding force between the separator and the positive electrode or a bonding force between the separator and the negative electrode is greater than or equal to 3 N/m; and
a controller;
wherein, the controller storing one or more programs that, when executed by the controller, cause the controller to:

in a first stage, charge the battery with a first-stage current until a voltage of the battery reaches a first-stage voltage value;

in a second stage, charge the battery with a second-stage current until the voltage of the battery reaches a second-stage voltage value, wherein the second-stage voltage value is greater than the first-stage voltage value, and the second-stage current is less than the first-stage current; and wherein the separator comprises a porous substrate, a heat-resistant layer coated on at least one surface of the porous substrate and a polymer adhesive layer, wherein the polymer adhesive layer is coated on a surface of the heat-resistant layer or a surface of the porous substrate without the heat-resistant layer coating, and the polymer adhesive layer comprises polymer particles, and a number of stack layers of the polymer particles in the polymer adhesive layer is less than or equal to four.

11. The electronic device according to claim 10, wherein in the second stage charging, the controller is further caused to charge the battery by a first charging mode or a second charging mode until the voltage of the battery reaches the second-stage voltage value:

the first charging mode comprises K charging sub-stages sequentially, K is an integer which is greater than or equal to 2, and the K charging sub-stages are set as $i^{th}$ charging sub-stage separately, i=1, 2, ..., K; in an $i^{th}$ charging sub-stage, charging the battery with one of an $i^{th}$ current value, and an $i^{th}$ voltage value, and an $i^{th}$ power value; in an $(i+1)^{th}$ charging sub-stage, charging the battery with one of an $(i+1)^{th}$ current value, and an $(i+1)^{th}$ voltage value, and an $(i+1)^{th}$ power value; wherein a charging current value of the $(i+1)^{th}$ charging sub-stage is less than or equal to a charging current value of the $i^{th}$ charging sub-stage, or the $(i+1)^{th}$ voltage value is greater than or equal to the $i^{th}$ voltage value, or the $(i+1)^{th}$ power value is less than or equal to the $i^{th}$ power value; and the second charging mode comprises D charging sub-stages sequentially, D is an integer greater than or equal to 2, and the D charging sub-stages are set as $j^{th}$ charging sub-stage separately, j=1, 2, ..., D; each of the $j^{th}$ charging sub-stage comprises a first $j^{th}$ charging sub-stage and a second $i^{th}$ charging sub-stage; in one of the first $j^{th}$ charging sub-stage or the second $j^{th}$ charging sub-stage, the battery is not charged, or the battery is charged or discharged with a first $j^{th}$ charging sub-stage current value for a time duration Tj1, and in the other one of the first $j^{th}$ charging sub-stage and the second $j^{th}$ charging sub-stage, the battery is charged with a second $j^{th}$ charging sub-stage current value for a time duration Tj2; wherein an absolute value of the first $j^{th}$ charging sub-stage current value is less than an absolute value of the second $j^{th}$ charging sub-stage current value.

12. The electronic device according to claim 11, wherein an average of current values of the $j^{th}$ charging sub-stage is less than a current value of the first stage, and an average of current values of the $(j+1)^{th}$ charging sub-stage is less than an average of current values of the $j^{th}$ charging sub-stage.

13. The electronic device according to claim 11, wherein the controller is further caused to execute:
in the first stage, charge the battery by a third charging mode until the voltage of the battery reaches the first-stage voltage value, and the third charging mode comprises the first charging mode or the second charging mode.

14. The electronic device according to claim 13, wherein a number of charging sub-stages K of the first charging mode in the first stage is equal to a number of charging sub-stages K of the first charging mode in the second stage, and a number of charging sub-stages D of the second charging mode in the first stage is equal to a number of charging sub-stages of the second charging mode in the second stage.

15. The electronic device according to claim 10, wherein the first-stage voltage value is equal to a charging limit voltage of the battery, and the second-stage voltage value is less than an oxidative decomposition voltage of an electrolyte of the battery.

16. The electronic device according to claim 10, wherein the polymer particles are selected from at least one of polyvinylidene chloride, polyvinylidene-fluoride-hexafluoropropylene copolymer, styrene-butadiene copolymer, polyacrylonitrile, butadiene-acrylonitrile polymer, polyacrylic acid, polyacrylate and acrylate-styrene, or a copolymer of at least two of the above polymer monomers, and a particle size of the polymer particles is 0.2 µm-2 µm.

17. The electronic device according to claim 10, wherein a coverage area ratio of the polymer adhesive layer on the porous substrate or on the heat-resistant layer is 15%-85%.

18. The electronic device according to claim 10, wherein the second-stage voltage value is less than a sum of the first-stage voltage value plus 500 millivolts.

* * * * *